W. Wright,
Steam-Engine Valve-Gear.
Nº 39,089. Patented June 30, 1863.

Witnesses.
A. C. Thompson
C. L. Jones

Inventor.
William Wright
by his Attorney,
J. S. Pierson
by S. H. Maynard

UNITED STATES PATENT OFFICE.

WILLIAM WRIGHT, OF HARTFORD, CONNECTICUT.

IMPROVED METHOD OF OPERATING CUT-OFF VALVES OF STEAM-ENGINES.

Specification forming part of Letters Patent No. 39,089, dated June 30, 1863.

*To all whom it may concern:*

Be it known that I, WILLIAM WRIGHT, of Hartford, county of Hartford, State of Connecticut, have invented a certain new and useful Improvement in Operating the Cut-Off Valves of Steam-Engines; and I do hereby declare that the following is a full, clear, and exact description of the same, reference being made to the annexed drawings, making a part of this specification, which is fully described herein, and in which similar letters indicate similar parts throughout the figures.

This invention is an improvement upon that for which Letters Patent of the United States were granted to me bearing date of January 3, 1854, numbered 10,398, and which I will now describe in words mainly extracted from said Letters Patent.

Figures 1, 3:
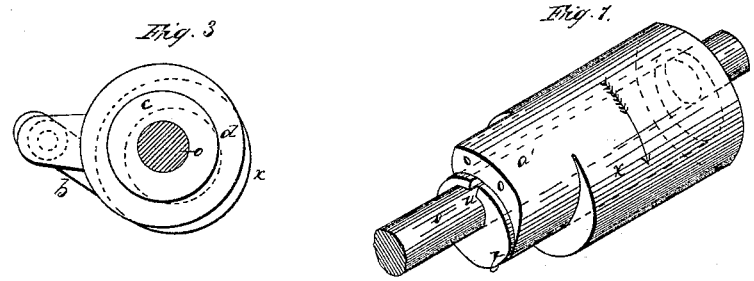

Figure 1 of the drawings hereunto annexed exhibits sufficiently for the present purpose the subject of the former patent.

Figure 2:
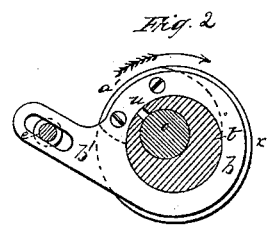
Figure 4:
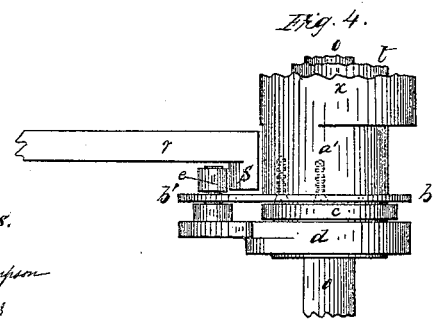

The stems *r r* of two puppet-valves of the usual construction have toes *s s*, which extend over the shaft *o*, which are lifted and let down at any desired portion of the stroke of the piston each by a cam of peculiar construction, and as the two are just alike the description of one will suffice for both. There is a hub, *t*, through which the rotating shaft *o* slides, the hub having a longitudinal slot, *u*, to receive a short feather on the shaft, that the two may turn together. This hub is cylindrical and eccentric to the shaft *o*, and to it is fitted a cylindrical sleeve, *x*, adapted to turn on the hub and is concentric therewith, and hence eccentric to the shaft *o*. The inner periphery of the sleeve is formed with an oblique groove to receive the feather of the shaft, which projects beyond the periphery of the hub, so that when the shaft slides in the hub in one direction the sleeve, by reason of the obliquity of the groove, will be turned in one direction, and vice versa. A portion of the sleeve *x* at one end *a* is cam shaped, as shown, and made to extend over the hub *t*. The sleeve and hub being concentric to each other, and a part of the circumference of the sleeve being reduced so as to be concentric, or nearly so, with the hub which forms a portion of its circumference where it extends over it, the consequence will be that when the sleeve is so turned that the eccentric part of the sleeve forms a continuation of the periphery of the hub the rotation of the shaft *o* and hub will not lift the valves, and hence steam will not be admitted, but when the sleeve is made to turn on the hub *t* by the sliding of the shaft *o* a portion of the periphery of the sleeve will project in the form of a cam, gradually returning to the periphery of the hub, so that by the sliding of the shaft the relative position of this cam-formed projection can be changed at pleasure to act upon the toe of the valve-stem to lift and let down the valve by the rotation of the shaft and hub, thus determining the part of the stroke at which the valve shall be let down to cut off the steam, for it will be seen that the more the sleeve is turned on the hub the greater will be the extent of the cam-formed projection. In this way by simply sliding the shaft *o* lengthwise the period of closing the valves can be changed so as to cut off longer or shorter, and, as the shaft *o* may be connected with the balls of the governor, the period of closing the valves will then be determined by the velocity of the engine, cutting off short when the engine moves fast and cutting off long when the engine moves slow, and so on in any intermediate degree. In this it is found desirable that the valves, whether puppet or slide, should be caused to return to the closed position by a positive force, irrespective of gravity or its equivalent, a spring, and my present improvement is in the manner of causing that return, as will appear from the following description of the construction. Upon the end of the cam-shaped portion of the sleeve *a'*, I affix a plate of metal, *b*, Figs. 2 and 4, so that it will turn with *a'* around the hub *t*. This plate has a slotted arm, *b'*, extending out from it, the line of the slot being nearly parallel with the rear edge of the cam, and as shown in Fig. 2. Outside of this plate the hub *t* is extended forward, as at *c*, Figs. 3 and 4, but this part is made concentric with the shaft *o*. Upon it is placed a collar, *d*, having an arm which carries a pin, *e*, and which pin, projecting through the slot in *b*, extends over the face of *a'*, as shown in Fig. 4. It has upon its end a friction-roller, and is to work against the outer side of the toe *s*, which must be so formed that by the riding up of the friction-roller upon it the lift-rod will be drawn back to the face of *t* so soon as the wiper *a'* has passed the toe *s*.

In operation, whenever the position of $a'$ upon $t$ is changed by the sliding of the shaft $o$, both the plate $b$ and the collar $d$ will rotate upon $t$, but as the part of $t$ upon which $b$ rotates is eccentric to $o$, while that upon which $d$ rotates is concentric with $o$, the pin $e$ will be moved along in the slot in $b$, and since it is always held by the collar $d$ at the same distance from the shaft $o$ it will by that motion in the slot preserve its due position with regard to the cam $a'$.

I claim—

The combination of the pin $e$, held in its relation to the face of the cam by the collar $d$, and the slotted plate $b$, with the toe of the lift rod, in the manner and for the purpose substantially as set forth.

WM. WRIGHT.

Witnesses:
V. BOILEAU,
WM. HAMERSLEY.